United States Patent Office 3,504,102
Patented Mar. 31, 1970

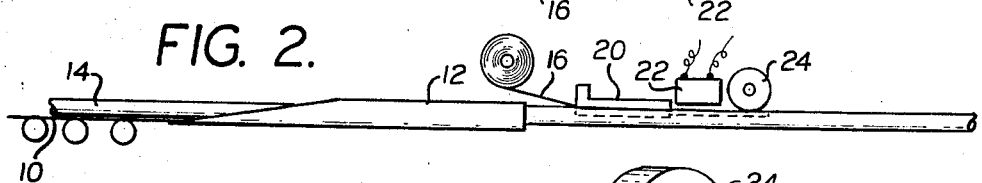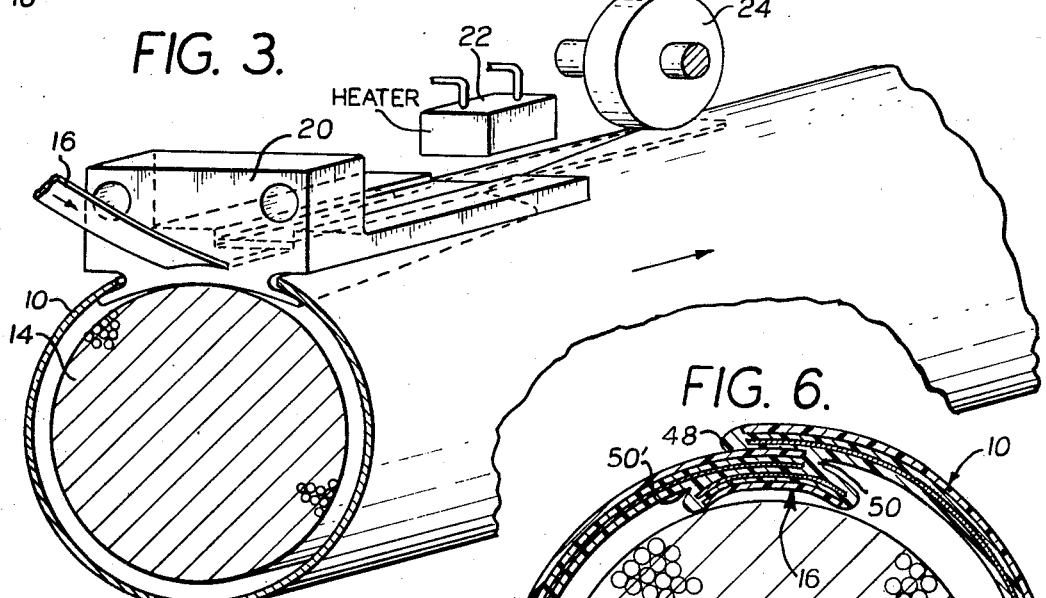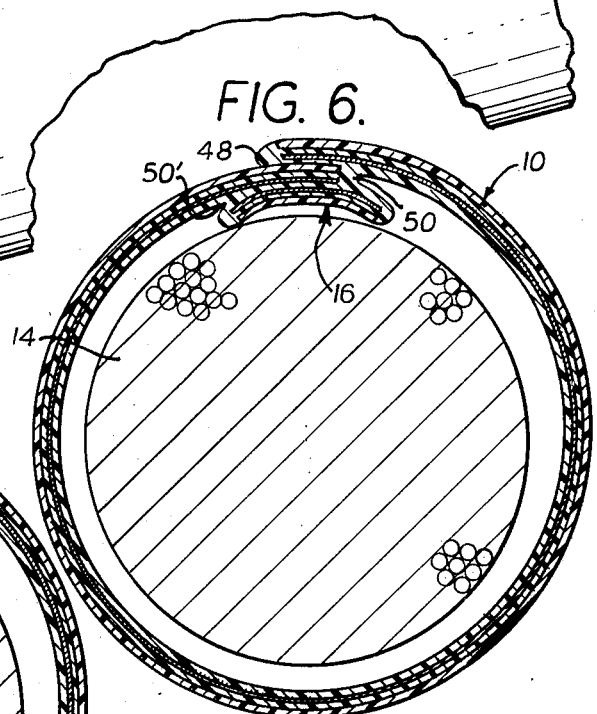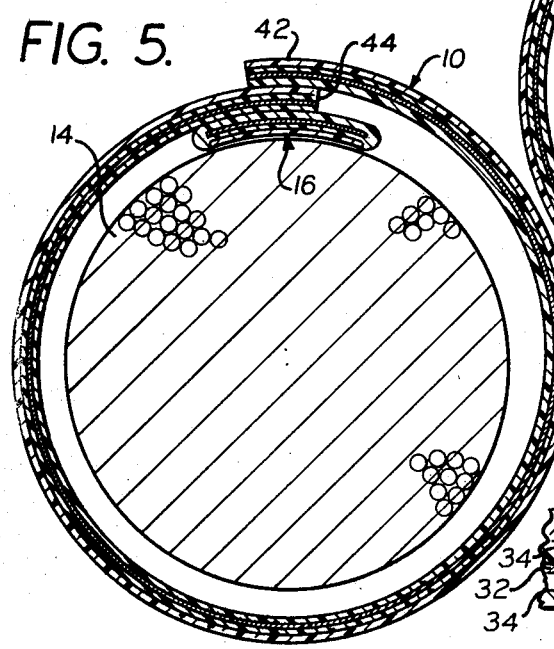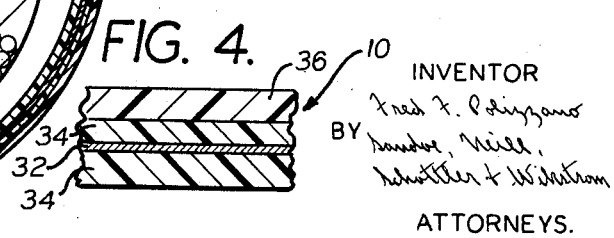

3,504,102
LAMINATED CABLE JACKET WITH SEALED AND REINFORCED SEAM
Fred F. Polizzano, Allendale, N.J., assignor to General Cable Corporation, New York, N.Y., a corporation of New Jersey
Filed May 28, 1968, Ser. No. 732,755
Int. Cl. H01b 7/28, 11/06
U.S. Cl. 174—107                    10 Claims

ABSTRACT OF THE DISCLOSURE

This disclosure includes an electric cable with a lap seam of a laminated cable jacket, and a method of making the cable. The cable jacket is a tape folded longitudinally around the core of the cable; and the tape is a lamination of a very thin strip of metal, such as aluminum or copper, which serves as a vapor barrier, and a coating on both sides of the metal of much greater thickness than the metal and bonded directly to the metal, preferably by a "chemical bond." The lap seam is preferably reinforced by a longitudinally extending plastic-metal laminate tape under the seam as a "bridging strip" with plastic coating and the confronting faces of the seam are heat-softened and pressed together to bond the edge portions of the seam together.

RELATED PATENTS AND APPLICATIONS

The tape used for making the jacket of this invention is plastic with a center lamination of metal which is very thin and used for the purpose of making the tape impervious to vapor, principally water vapor. Tape of the type used is disclosed in Jachimowicz Patent No. 3,206,541, issued Sept. 14, 1965. That patent discloses the forming of a seam with a radially extending tab along the seam, and the tab is bent over against the circumference of the jacket to complete the jacketing operation.

The making of electrical cable with a laminated jacket having a lap seam is disclosed in Garner Patent No. 3,332,138, issued July 25, 1965; but the Garner patent uses a different kind of tape which is a metal strip constituting most of the thickness of the tape, there being relatively thin laminations of plastic on the outside surface of the tape.

SUMMARY OF THE INVENTION

This invention provides an electric cable with a lap seam made with tape that is plastic except for the thin vapor barrier lamination of metal, such as aluminum or copper. The method used for the tape having the thicker metal lamination disclosed in Patent No. 3,233,036 is not suitable when the tape is essentially a plastic one with only a vapor barrier of metal. It is harder to fuse a lap seam with such a laminate because of the different effect of the heating.

The plastic is a poor conductor of heat, and the plastic coatings on the thicker metal laminate are thin and the underlying metal is a good conductor and serves as a heat sink for carrying away excess heat from the region of the seam. With the metal foil laminate tape of this invention, the plastic coatings are several times thicker than the metal and considerably thicker than the corresponding coatings on a tape that has a thicker metal laminate. The foil does not have enough cross section to carry away successive local heating; and the poor heat conductivity of the thicker plastic coatings makes the heating more critical because excess heating causes the plastic to flow away or to soften beyond the foil. It is important to avoid sticking of the outside plastic to the closing die and to the protecting jacket that is extruded over the sheath.

With the metal foil laminate tapes, there are advantages in having the plastic coating, on at least the outside of the packet, in two layers, and with the outer layer or lamination of plastic of a higher fusing temperature than the inner layer.

Another expedient used with this invention is a bridging or reinforcing tape that spans the lap seam on the inside. When tape is used which has an outer lamination with a higher temperature fusion point, the bridging or reinforcing tape is turned inside out, as compared with the tape that forms the lap seam of the sheath, so that the lower melting point plastic of the bridging or reinforcing tape confronts the lower melting point plastic on the inside of the other tape which forms the sheath.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIGURE 1 is a diagrammatic top plan view of apparatus for making electrical cable in accordance with this invention;

FIGURE 2 is a diagrammatic side elevation of the apparatus shown in FIGURE 1;

FIGURE 3 is a greatly enlarged, isometric detail view of a part of the apparatus shown in FIGURES 1 and 2.

FIGURE 4 is a greatly enlarged fragmentary sectional view through the tape used in FIGURES 1 through 3;

FIGURE 5 is an enlarged sectional view on the section line 5—5 showing the tapes and cable core in assembled relation prior to fusing of the plastic coatings; and FIGURE 6 is a view similar to FIGURE 5 but taken at the section line 6—6 and showing the seam after the plastic coatings have been fused.

DESCRIPTION OF THE PREFERRED EMBODIMENT

FIGURE 1 shows a tape 10 which is advanced through a forming guide 12 which bends the tape longitudinally into a tube with a lap seam. An electrical conductor core 14 is advanced with the tape so that the tape forms around and encloses the core. A second tape 16, substantially narrower than the tape 10, is also advanced into the forming guide 12 with the tape 10 and the core 14. This tape 16 will be referred to herein as a bridging or reinforcing tape, the function of which will be explained in connection with other views of the drawing. The tape 10 forms a sheath around the core 14 and the lap seam formed is one in which one edge portion of the tape 10 overlaps the other edge portion in such a way that the inside of the first edge portion confronts the outside surface of the other edge portion. Thus the sheath is substantially circular in cross section and does not have the usual upstanding tab which has been conventional in the prior art.

At the end of the forming guide 12, there is a sealing shoe 20 which guides the edge portions of the tape 10 in its final forming operation. A heater 22 is carried by the sealing shoe 20 and the heater 22 is preferably an inductor. Other kinds of heaters can be used, but it is important that the heater effect a rapid rise in temperature along the localized regions where the plastic coatings on the tapes are to be fused and without permitting time for the heat to travel down into the cable core.

Immediately beyond the heater 22, a sealing roll 24 contacts with the seam through an opening in the top of the shoe 20. Other means can be used for applying sealing pressure to the seam, but the roll 24 has the advantage that the surface in contact with the heated sheath is constantly changing so that the roll carries heat away from the seam and promotes more rapid cooling. If desired, the roll 24 can be artificially cooled.

FIGURE 4 is an enlarged sectional view through the tape 10. The tape 16 can have the same construction. In the illustrated tape there is a metal foil laminate 32 with plastic coating 34 on both its upper and lower surfaces. The metal foil 32 is preferably aluminum or copper of a thickness less than about one mil. Aluminum foil of .7 mil has been used effectively. The plastic coatings 34 are preferably polyethylene of a thickness between about 4 to 10 mils. It is advantageous to use a low density copolymer of polyethylene modified with monomers containing reactive carboxyl groups. Such a copolymer obtains an extremely effective bond to the metal foil and may be said to be "chemically bonded" to the metal. In practice, a thickness of 4 or 5 mils has been used effectively for the coatings 34.

The tape 10 can be made with only the thin lamination 32 and the two coatings 34; but there are advantages in having a fourth lamination or outer coating 36 over the upper coating 34 as this outer coating is a plastic with a higher softening point than the underlying coating 34. For example: the coating 34 can be a low density polyethylene and the coating 36 a high density polyethylene with resulting higher softening or melting temperature. The outer coating or laminate 36 can be from 4 to 10 mils in thickness, but where two laminations are used on one side of the foil 32, as illustrated in FIGURE 4, the coating 34, which is under the outer coating 36, can be slightly thinner than the coating 34 on the under side of the foil; for example: a coating 34 of 4 mils and a coating 36 of 5 mils can be used. These values are given by way of illustration.

FIGURE 5 shows the tape 10 formed into a tube around the core 14 and with one edge portion 42 of the tape overlying the opposite edge portion 44. The bridging or reinforcing tape 16 is located under the lap seam formed by the edge portions 42 and 44. This reinforcing tape 16 is preferably wider than the lap of the edge portions 42 and 44 and it extends beyond the edge portion 44 so as to bond to part of the area of the edge portion 42 which extends beyond the edge portion 44, as will be explained in connection with FIGURE 6.

The tape 16 is shown with the same construction as the tape 10 and the corresponding laminations are indicated by the same reference characters as in FIGURE 4 with a prime appended. It is one feature of the invention that when a reinforcing tape is used, which has a/higher density coating on one side than the other, the side with the lower density coating exposed confronts the inside of the tubular sheath formed by the tape 10. Since the tape 10 is formed with the lower density coating on the inside, this brings together confronting faces of the tape 10 and tape 16 which fuse at the lowest temperatures, and it is not necessary to raise the top or outer face of the tape 16 to as high a temperature as the outer face of the edge portion 44 which is nearer to the source of heat.

FIGURE 6 shows the seam after the confronting faces of the seam have been raised to fusion temperature and pressed into contact with one another. The outer surface 36 of the inner edge portion 44 is raised to a fusion temperature but does not soften to the same extent as the inner plastic coating of the edge portion 42. Thus some of the plastic on the inside of the edge portion 42 is squeezed out of the seam to form a bead 48 which covers the exposed edge of the metal foil, if that edge is exposed in the tape 10 as originally supplied. The bead 48 also strengthens the bond and gives the seam a smoother finish. On the inside of the edge portion 44, plastic is squeezed out to form a fillet 50 which connects a portion of the tape 16 to the inside of the tape 10 beyond the end of the edge portion 44. A similar fillet 50' forms along the other edge of the tape 16 but the distance here between the metal foils is less and the fillet is less pronounced. It should be noted, however, that while the seam shown in FIGURE 5, before fusion, has a thickness equal to three times the thickness of the tapes, the thickness of the finished seam, shown in FIGURE 6, is considerably reduced as a result of the squeezing out of the low density plastic when the confronting faces of the tapes are pressed together.

The plastic coatings on the tapes are heated sufficiently to cause them to bond together and the lower density coatings are heated sufficiently to cause them to flow. The expressions "fusion" or "fusion temperature" are used herein to indicate temperatures at which the plastics will bond together when brought in contact with one another. This is a temperature of softening or incipient fusion and may be somewhat less than the actual "melting" temperature of the plastic.

The sheath is formed around the core 14 with some clearance so that the core can move with respect to the sheath for greater flexibility of the cable; but the clearance shown in FIGURES 5 and 6 is purposely exaggerated for clearer illustration.

After the seam of the sheath has been "welded" or bonded together as described, an outer protecting jacket is usually extruded over the sheath as a continuous operation with the forming and sealing of the sheath. An important advantage of the outer laminate of higher density plastic permits the protecting jacket to be extruded at higher temperature without risk of having the plastic of the sheath fuse to the extruded plastic of the jacket. Such a fusing of the protecting jacket to the sheath has two disadvantages. It reduces the flexibility of the cable and it makes difficult the stripping of the outer jacket for connections without risk of damage to the coating on the metal foil.

The preferred embodiment of the invention has been illustrated and described, but changes and modifications can be made and some features can be used in different combinations without departing from the invention as defined in the claims.

What is claimed is:

1. An electrical cable including a conductor core with insulation thereon, a jacket surrounding the core and comprising a tape having a vapor-impervious metal foil with plastic coating bonded to both sides of the metal foil, the plastic on each side being a number of times thicker than the foil, said tape being of a width greater than the circumference of the core and being longitudinally folded around the core and forming a tube with the edge portions of the tape overlapping one another to make a lap seam which extends longitudinally of the cable, a reinforcing strip extending lengthwise of the seam within the tube between the core and the lap seam, said reinforcing strip having a plastic outside face that is fused to the plastic on the inside face of the inner edge portions of the lap seam and also to the inside face of the tape for a distance beyond the edge of the inner edge portion of the lap.

2. The electrical cable described in claim 1 characterized by the metal foil being aluminum of approximately one mil or less in thickness, and each of the plastic coatings being of approximately 4 to 10 mils in thickness.

3. The electrical cable described in claim 1 characterized by the plastic coating being polyolefin comprising a copolymer of polyethylene modified with monomers containing reactive carboxyl groups.

4. The electrical cable described in claim 1 characterized by the plastic coating on the edge portions of the tube and on the reinforcing strip extending also around the edges of the tube and the reinforcing strip.

5. The electrical cable described in claim 1 characterized by the tape having a lamination of plastic on its outside surface of higher softening temperature than the other plastic on the tape, and the reinforcing strip having plastic on its outer surface of lower softening temperature than that on the outside surface of the tape whereby the confronting surfaces of the reinforcing strip and the inside of the tubularly formed tape can be fusion bonded to one another without fusing the plastic on the outer surface of the tape.

6. The electrical cable described in claim 5 characterized by the plastic of lower softening temperature being a copolymer of polyethylene modified by monomers containing reactive carboxyl groups, the tape having the same copolymer of polyethylene on both sides and having an outer layer over the polyethylene as a fourth lamination of the tape, the outer layer being a higher density polyethylene.

7. The electrical cable described in claim 5 characterized by the reinforcing strip having on its inside surface a layer of plastic of higher softening temperature than that of the plastic on the confronting faces of the reinforcing strip and inside surface of the tubularly formed tape.

8. The electrical cable described in claim 7 characterized by both the reinforcing strip and the tape having low density plastic on both sides of the metal foil and a higher density plastic over the lower density plastic on at least one side, the higher density plastic being on the inside surface of the reinforcing strip and on the outside surface of the tape.

9. The electrical cable described in claim 1 characterized by the reinforcing strip being of substantially the same laminated construction as the tape, and both the tape and the reinforcing strip having similar layers of plastic on both sides and having a layer of plastic of higher softening temperature over the other plastic on at least one side of the foil, the layer of higher softening temperature plastic being on the outside of the tape and on the inside of the reinforcing strip.

10. The electrical cable described in claim 9 characterized by the metal foil being from the group consisting of aluminum and copper and having a thickness less than about 1 mil, the plastic that covers both sides of the foil of the tape and the reinforcing strip being from about 4–10 mils in thickness, and a higher softening temperature plastic also being from about 4–10 mils in thickness.

References Cited

UNITED STATES PATENTS

| | | | |
|---|---|---|---|
| 2,697,772 | 12/1954 | Kinghorn | 174—102 |
| 2,492,568 | 12/1949 | Gillis | 174—102 |
| 3,087,007 | 4/1963 | Jachimowicz | 174—110 |
| 3,233,036 | 2/1966 | Jachimowicz | 174—107 |

LEWIS H. MYERS, Primary Examiner

A. T. GRIMLEY, Assistant Examiner

U.S. Cl. X.R.

174—110, 115